United States Patent
Kouroussis et al.

(10) Patent No.: US 10,186,866 B2
(45) Date of Patent: Jan. 22, 2019

(54) SMART-GRID ADAPTIVE POWER MANAGEMENT METHOD AND SYSTEM WITH POWER FACTOR OPTIMIZATION AND TOTAL HARMONIC DISTORTION REDUCTION

(71) Applicant: Networked Power Inc., Menlo Park, CA (US)

(72) Inventors: Denis Kouroussis, Markham (CA); Emre Kulali, Menlo Park, CA (US)

(*) Notice: Subject to any disclaimer, the term of this patent is extended or adjusted under 35 U.S.C. 154(b) by 204 days.

(21) Appl. No.: 15/245,114

(22) Filed: Aug. 23, 2016

(65) Prior Publication Data

US 2016/0372924 A1 Dec. 22, 2016

Related U.S. Application Data

(63) Continuation of application No. 14/494,311, filed on Sep. 23, 2014, now Pat. No. 9,448,577, which is a continuation of application No. 12/883,065, filed on Sep. 15, 2010, now Pat. No. 8,874,277.

(60) Provisional application No. 61/242,467, filed on Sep. 15, 2009.

(51) Int. Cl.
| | |
|---|---|
| *H02J 3/18* | (2006.01) |
| *H02M 1/42* | (2007.01) |
| *G05B 15/02* | (2006.01) |
| *G05F 1/66* | (2006.01) |
| *G05B 13/02* | (2006.01) |
| *H02J 3/01* | (2006.01) |

(Continued)

(52) U.S. Cl.
CPC .............. *H02J 3/18* (2013.01); *G05B 13/021* (2013.01); *G05B 15/02* (2013.01); *G05F 1/66* (2013.01); *H02J 3/01* (2013.01); *H02J 3/1892* (2013.01); *H02M 1/4233* (2013.01); *H02J 13/0006* (2013.01); *H02M 5/458* (2013.01); *Y02B 70/126* (2013.01)

(58) Field of Classification Search
CPC .. H02J 3/18; H02J 3/01; H02J 13/0006; H02J 3/1892; G05B 13/021; G05B 15/02; G05F 1/66; H02M 1/4233; H02M 5/458; Y02B 70/126

See application file for complete search history.

(56) References Cited

U.S. PATENT DOCUMENTS

| | | | | |
|---|---|---|---|---|
| 4,336,462 A * | 6/1982 | Hedges | ...................... | H02J 3/14 307/35 |
| 4,471,232 A * | 9/1984 | Peddie | ...................... | H02J 3/14 307/35 |

(Continued)

*Primary Examiner* — Christopher E. Everett

(57) ABSTRACT

A method and system of power factor optimization and total harmonic distortion are provided under the premise of efficient power management and distribution on an electrical grid. The method and system include a novel optimization technique based on a novel current profiling methodology enabling real-time power management with power factor correction as a function of the optimization. The optimization can be performed under dynamic current constraints. When deployed on an electrical grid, the method and system can provide a new technique for power management targeting an efficiency of the electrical grid. The method and system can thus provide for reduced costs of energy production and reduced carbon emissions into the atmosphere.

13 Claims, 5 Drawing Sheets

(51) Int. Cl.
*H02M 5/458* (2006.01)
*H02J 13/00* (2006.01)

(56) References Cited

U.S. PATENT DOCUMENTS

| | | | | |
|---|---|---|---|---|
| 4,549,274 A * | 10/1985 | Lerner | ...................... | H02J 3/14 307/35 |
| 4,581,705 A * | 4/1986 | Gilker | .................... | G01R 19/02 324/76.11 |
| 5,041,959 A * | 8/1991 | Walker | ................... | H02J 15/00 307/46 |
| 5,481,140 A * | 1/1996 | Maruyama | ................ | H02J 3/14 307/11 |
| 5,600,527 A * | 2/1997 | Engel | ................... | G01R 21/133 341/123 |
| 5,604,385 A * | 2/1997 | David | ...................... | H02J 3/14 307/18 |
| 5,650,936 A * | 7/1997 | Loucks | .............. | G01R 19/2513 324/118 |
| 5,742,103 A * | 4/1998 | Ashok | ................ | H01R 13/6675 307/105 |
| 5,752,046 A * | 5/1998 | Oprescu | .................... | G06F 1/26 713/300 |
| 6,018,690 A * | 1/2000 | Saito | ........................ | H02J 3/14 700/293 |
| 6,233,693 B1* | 5/2001 | Berglund | .................. | G06F 1/26 711/112 |
| 6,510,369 B1* | 1/2003 | Lacy | ........................ | H02J 3/14 700/295 |
| 6,694,270 B2* | 2/2004 | Hart | ...................... | G01D 4/004 700/297 |
| 6,925,363 B2* | 8/2005 | Hutton | ..................... | H02J 3/14 307/31 |
| 7,256,516 B2* | 8/2007 | Buchanan | ........... | B60L 11/1811 307/62 |
| 7,373,222 B1* | 5/2008 | Wright | ...................... | H02J 3/14 700/20 |
| 7,415,725 B2* | 8/2008 | Henneberry | ....... | G01R 19/2513 700/286 |
| 7,441,133 B2* | 10/2008 | Giat | ........................ | H04L 12/10 713/300 |
| 7,580,775 B2* | 8/2009 | Kulyk | ........................ | H02J 3/14 307/39 |
| 7,884,498 B2* | 2/2011 | Ecker | .................. | A47L 15/0047 307/35 |
| 7,895,456 B2* | 2/2011 | Ferentz | ................... | H04L 12/12 713/300 |
| 7,898,104 B1* | 3/2011 | Verges | ...................... | H02J 3/26 307/115 |
| 7,928,689 B2* | 4/2011 | Kawamoto | ............ | G06F 1/263 320/106 |
| 8,054,598 B1* | 11/2011 | Sadler | ...................... | H02J 3/14 361/63 |
| 9,093,833 B1* | 7/2015 | Ellenbogen | .............. | H02H 3/00 |
| 2005/0107892 A1* | 5/2005 | Matsui | ...................... | H02J 3/14 700/28 |
| 2006/0276938 A1* | 12/2006 | Miller | .................... | G06Q 50/06 700/295 |
| 2007/0059986 A1* | 3/2007 | Rockwell | ........... | G01R 19/2513 439/638 |
| 2007/0228838 A1* | 10/2007 | Delmerico | ................ | H02J 3/16 307/84 |
| 2008/0039980 A1* | 2/2008 | Pollack | ............... | B60L 11/1824 700/295 |
| 2008/0167756 A1* | 7/2008 | Golden | .................. | G05B 15/02 700/297 |
| 2009/0283129 A1* | 11/2009 | Foss | ...................... | H02M 7/493 136/244 |
| 2009/0326731 A1* | 12/2009 | Bowdry | ................ | G01D 4/004 700/297 |
| 2010/0017045 A1* | 1/2010 | Nesler | ................ | B60L 11/1824 700/296 |
| 2010/0019740 A1* | 1/2010 | Hashimoto | ......... | H02M 5/4585 322/58 |
| 2010/0138363 A1* | 6/2010 | Batterberry | ............ | G06Q 10/04 705/412 |
| 2010/0145535 A1* | 6/2010 | Tyler | ................... | B60L 11/1824 700/292 |
| 2010/0187914 A1* | 7/2010 | Rada | ........................ | G05F 1/70 307/105 |
| 2010/0198421 A1* | 8/2010 | Fahimi | ...................... | H02J 3/32 700/291 |
| 2010/0208501 A1* | 8/2010 | Matan | .................... | H02J 3/18 363/95 |
| 2010/0314942 A1* | 12/2010 | Talkin | .................... | G06Q 50/06 307/41 |
| 2010/0332047 A1* | 12/2010 | Arditi | ...................... | H02J 3/18 700/298 |
| 2011/0148202 A1* | 6/2011 | Rada | ........................ | G05F 1/70 307/52 |

* cited by examiner

SMART-GRID ADAPTIVE POWER MANAGEMENT METHOD AND SYSTEM WITH POWER FACTOR OPTIMIZATION AND TOTAL HARMONIC DISTORTION REDUCTION

CROSS REFERENCE TO RELATED APPLICATIONS

This application is a continuation of U.S. patent application Ser. No. 14/494,311, filed Sep. 23, 2014, which is a continuation of U.S. patent application Ser. No. 12/883,065, filed Sep. 15, 2010, which claims the benefit of U.S. Provisional Patent Application No. 61/242,467, filed Sep. 15, 2009.

BACKGROUND

Field

Embodiments of the present invention relate to technologies for electrical utility load balancing and power management.

Description of the Related Art

Smart-grid technology concepts have been in development since the introduction of power electronics some 30 years ago. In particular, many power electronics systems have been used to load balance the electrical grid using both heuristics and user intervention at a very high "macro-management" power level. Utilities are starting to realize the full potential of smart grid applications to manage power on the grid using the Internet and wireless communication techniques. As economies and electrical power consumption grow, it is imperative that grids operate to the highest efficiency levels possible in order to conserve energy resources and reduce carbon emissions into the atmosphere. It has been claimed that a 1% increase in efficiency of the U.S. electrical grid can reduce carbon dioxide ($CO_2$) emissions by 50 billion pounds.

In general, power flow management and power factor correction has been previously done using two methods. One method has been at a high system level, using flexible alternating current (AC) transmission systems (FACTS), and another method has been at the electrical device level, using power factor correction techniques.

FACTS have been proposed in recent years to manage the power flow of transmission grid systems. These devices include phase shifting transformers, impedance modulators, series compensation capacitors and other power electronics based devices which are installed at transmission line stations to adjust power flow in each transmission line. Due to the high voltage associated with transmission lines in the range of 100 to 800 kV, the cost of such devices is very high. FACTS require the addition of new components for providing power flow control without exploiting the properties of existing network components. There are two forms of FACTS compensation that are applied to the transmission system, namely shunt and series compensation.

In shunt compensation, the grid or power system is connected in shunt with the FACTS and works as a controllable current source. Shunt capacitive compensation is used to improve power factor on the grid by compensating for inductive loading. Shunt compensation works by injecting reactive current into the line to maintain voltage magnitude. Transmittable active power is increased, but more reactive power has to be provided.

In series compensation, the FACTS system is connected in series with the line and works to modify the line impedance. The impedance is reduced so as to increase the transmittable active power, however, at the same time, more reactive power must be provided.

At the subsystem level or individual device level, power factor correction is performed similarly to a FACTS system but with lower costs and more intelligent control. Capacitive and inductive loading are used in a series or shunt with the load, and power factor correction is performed with additional power electronics that can adjust power factor accordingly. Some newer forms of power factor correction are performed at the device level by intelligently switching the power supplies of the device. Again, there is additional hardware cost associated with these types of devices and no control of load demand operation.

When demand for power increases during peak hours, in some small cases utilities will reduce the voltage production in order to reduce the current consumption of the loads on the grid. This is effective, but only for a few percentage points of reduction, as a last resort, before brown-outs are implemented.

In the U.S., the power flow management in recent years has become very challenging due to a significant integration of power systems across regions of the country. Changes in demand for power at different points in the grid can cause grid congestion, the consequences of which may include price spikes, load dropping and if these measures do not suffice loss of power to one or more areas.

From the foregoing background discussion, it should be apparent to those of ordinary skill in the art that the efficient distribution of power over an electrical grid remains a significant problem especially if one is to factor in the introduction of additional large loads, such as new factories and communities without the building of new power generation plants, for which a solution would be highly desirable. Therefore, in view of the shortcomings of the prior-art technologies, a new method and system for distributing power and controlling to the power flow to non-critical loads over an electrical grid remains highly desirable.

SUMMARY

According to an embodiment of the invention, a method of power factor correction in a power delivery system includes determining a total current requirement of a load coupled to a current supply. The method further includes determining any current available beyond the total current requirement. The method further includes determining whether a non-critical load is coupled to the current supply. The method further includes calculating an optimal switch configuration to deliver available current to the non-critical load when a current requirement of the non-critical load exceeds the current available beyond the total current requirement.

According to another embodiment of the invention, an apparatus for power factor correction in a power delivery system includes a total current determining unit configured to determine a total current requirement of a load coupled to a current supply. The apparatus further includes a current determining unit configured to determine a current available beyond the total current requirement. The apparatus further includes a non-critical load determining unit configured to determine whether a non-critical load is coupled to the current supply. The apparatus further includes a calculating unit configured to calculate an optimal switch configuration to deliver available current to the non-critical load when a current requirement of the non-critical load exceeds the current available beyond the total current requirement.

According to another embodiment of the invention, a method of power factor correction in a power delivery system includes determining a total current requirement of at least one load coupled to a current supply. The method further includes determining any current available beyond the total current requirement of the at least one load coupled to the current supply. The method further includes determining if a non-critical load is coupled to the current supply. The method further includes comparing a current requirement of the non-critical load to a plurality of current profiles within a database to determine an optimal switch configuration to deliver current to all loads within the power delivery system when the current requirement of the non-critical load exceeds the current available beyond the requirement of the at least one load. The plurality of current profiles corresponds to a plurality of loads coupled to the power delivery system.

According to another embodiment of the invention, an apparatus for power factor correction in a power delivery system includes means for determining a total current requirement of a load coupled to a current supply. The apparatus further includes means for determining a current available beyond the total current requirement. The apparatus further includes means for determining whether a non-critical load is coupled to the current supply. The apparatus further includes means for calculating an optimal switch configuration to deliver available current to the non-critical load when a current requirement of the non-critical load exceeds the current available beyond the total current requirement.

According to another embodiment of the invention, a system for power factor correction in a power delivery system includes a total current determining unit configured to determine a total current requirement of a load coupled to a current supply. The system further includes a current determining unit configured to determine a current available beyond the total current requirement. The system further includes a non-critical load determining unit configured to determine whether a non-critical load is coupled to the current supply. The system further includes a calculating unit configured to calculate an optimal switch configuration to deliver available current to the non-critical load when a current requirement of the non-critical load exceeds the current available beyond the total current requirement.

BRIEF DESCRIPTION OF THE DRAWINGS

Further embodiments, details, advantages, and modifications of the present invention, will become apparent from the following detailed description of the preferred embodiments, which is to be taken in conjunction with the accompanying drawings, wherein.

DETAILED DESCRIPTION

Figure 1:
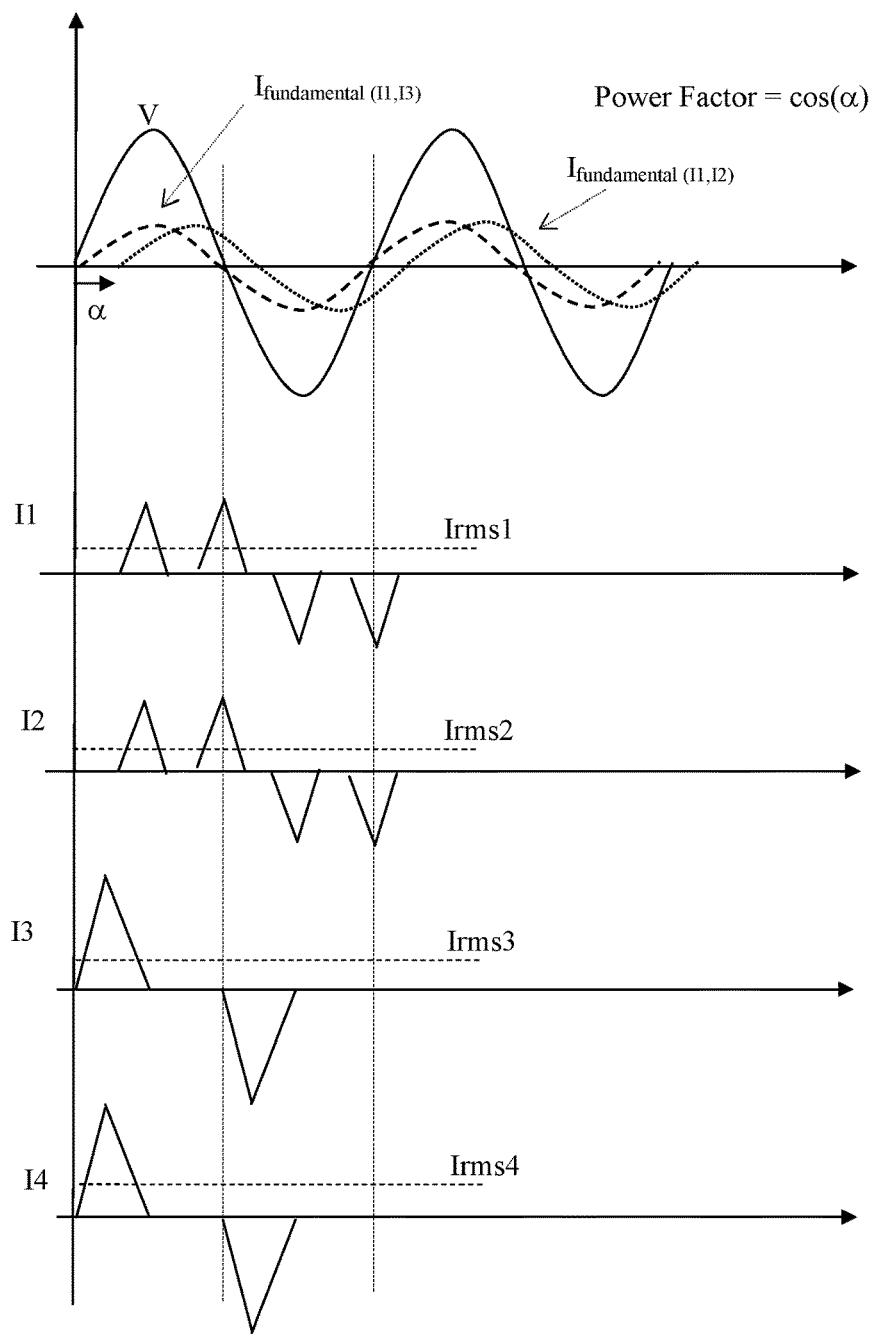
FIG. 1 illustrates current profiling utilized to optimize a power factor in accordance with an embodiment of the invention.

It will be readily understood that the components of the present invention, as generally described and illustrated in the figures herein, may be arranged and designed in a wide variety of different configurations. Thus, the following more detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage to "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Terms that are used throughout this specification will now be defined. The term "voltage" refers to the sinusoidal voltage waveform that is typical of an electric utility provider. Voltage can refer to 120 volt (V) single phase, 240V phase-to-phase or even 480V three phase.

The term "phase" refers to the angle between sinusoidal voltage waveforms or the angle between voltage and current. The term "phase" is also used to describe a single phase line of a three phase system.

The term "current" refers to the amount of current (in Amperes) that is drawn by a load device or provided by a source. This current may be of any type, for example, sinusoidal, trapezoidal, saw tooth or any derivative thereof which may be caused by a linear or nonlinear load or source. The terms "current" and "power" may be used interchangeably as power is essentially Voltage*Current and the Voltage on the electric utility is always constant.

The abbreviation "RMS" refers to the "root-mean-square" or average of a particular waveform. RMS may be use to define the average voltage such as 120V (which is the RMS value of a single phase sinusoidal waveform that an electric utility provides) or the average current that is either being used by a load or injected into the grid by a source.

The term "load" refers to any electrical device that is connected to the electric utility grid and draws a certain amount to current (or power) in its on operation. Loads may be linear in that they are composed of completely resistive, capacitive or inductive elements, or nonlinear in which they contain some form of rectification equipment (AC to direct current (DC) converter, for example) or other type of converter having switch mode power supplies.

The term "non-critical load" refers to a load which is connected to the grid but does not always require power, meaning that its operation is not dependent on continuous power draw. Examples of non-critical loads are electric vehicles which are charging, refrigerators, air conditioning units, in some unique cases computer servers and the like.

The term "source" refers to any type of electrical device that produces electrical power (or current) and feeds it to the electric utility grid.

The term "grid" refers to the electric utility grid or electric distribution network as it is commonly known. The term "sub-grid" may also be used in order to refer to a small section of the electric utility grid.

The term "smart-grid" refers to any grid that has voltage and current sensors and ability to turn loads ON or OFF with some form of communication medium, as well as being able to activate sources to provide more power to the grid and thus, being able to balance loads.

The term "power flow" refers to the direction of power entering into or exiting from the grid. The terms "power flow" and "current flow" are essentially interchangeable for the grid.

The term "power factor" refers to the ratio of the real power flowing to a load in relationship to the apparent power and is a number between 0 and 1. Power factor can also be expressed as a percentage. Power factor can also be viewed as the efficiency of the system, with 1 being the most efficient state.

The terms "total harmonic distortion" and "THD" refer to the amount of deviation expressed as a percentage of a load current or summation of load currents to an ideal sinusoidal waveform. An ideal linear load will have THD of 0.

The term "current profile" is the current waveform (also identified as a current use pattern) produced by either a load or a source connected to the grid. A current profile can be the waveform over a single AC cycle or multiple cycles as needed.

The term "power library" is the storage of current profiles on an electronic database for simulation and calculation purposes. For each load or source there may be multiple current profiles within the power library.

The term "power constraints" refers to the upper bound power or current that the grid can handle or the upper bound current that all sources can provide in real time.

The term "sub-grid power constraints" refers to the upper bound power or current that a sub-grid of the grid can handle or the upper bound current that the sources that correspond to the sub-grid can provide in real time.

The term "zero-crossing" is the event of either the voltage or current waveforms where the waveform value is zero.

The terms "optimization" and "optimization technique" refer to the algorithmic process and mathematical calculation of determining the set of optimum current switching profiles required to satisfy the power constraints and maximize power factor with THD as an additional constraint.

The terms "energy management system" and "EMS" are used broadly to refer to the management systems of buildings that may use electricity from the grid to store power in either a battery system, super/ultra capacitor bank, electromechanical energy storage system or any combination thereof.

The terms "intelligent load management controller" and "ILMUC" are used broadly to refer to a device capable of regulating voltage and or current to a load. The ILMUC also has the ability to measure current in real time. A load/source power flow controller may be an independent device or integrated within an electrical load or source device. The ILMUC contains microcontroller and other electronic control components, communications ability (such as Transmission Control Protocol/Internet Protocol (TCP/IP) and International Mobile Telecommunications-2000 (3G)), a solid state relay (such as a thyristor, an insulated-gate bipolar transistor (IGBT), a metal-oxide-semiconductor field-effect transistor (MOSFET), a MOS controlled thyristor (MCT), a bipolar junction transistor (BJT), and a gate turn-off thyristor (GTO)), voltage, and current sensors. Through the communications ability, the ILMUC is able to execute commands from a central power management server and control power flow to or from loads.

The term "power management server" refers to a computer server, either running independently or on a cloud architecture that is running optimization power management software with the ability to communicate with intelligent load management unit controllers.

As previously described, the advent of carbon taxation and resource management will place new substantial demands on producers of electricity and, therefore, increase costs of electric consumption to the end user. As energy management systems are gaining popularity and being rapidly deployed, it becomes of critical importance to manage and regulate power flow in order not to exceed demand levels out of the specifications of the grid and/or substations utilizing the full capabilities of the systems. Due to the fact that the majority of energy storage systems and renewable sources of energy (wind and solar) require some form of electrical conversion (AC-AC, DC-AC, AC-DC) and contain some form of switch mode inverters, total harmonic distortion regulation also needs to be considered. Compounding these considerations, it is also of imperative importance to keep the cost and economies of any solution to reasonable levels.

According to an embodiment of the invention, a novel method, apparatus, and system is provided for utilities or large users of electricity to manage power over an electrical grid. According to the embodiment, a novel technique is utilized that employs adaptive hardware and software, and a learning methodology, to optimize a power factor and reduce total harmonic distortion on the grid, under the premise of upper bound current constraints on loads of localized regions, or sub-grids, of the grid, as well as a global upper bound current constraint.

According to the embodiment, current profiles are generated by ILMUCs and stored in a central power management database or power library. These current profiles can be generated under a number of different switching conditions with a varying duty cycle and frequency. An optimization algorithm can then determine the optimum load/source switching method by which power constraints are satisfied and in which, the power factor is maximized while satisfying a total harmonic distortion constraint. This optimum switching method can then, in real time, be transmitted to the ILMUCs for implementation and synchronous load/source switching.

In order to reduce computational overhead, the grid can be divided into sub-grids that can be macro-modeled for mathematical and heuristic algorithmic efficiency. Sub-grid macro-modeling can effectively be user defined or based on a default setting. Sub-grid power constraints can also be used to perform fast re-optimized calculations when events occur to the sub-grid such as new loads/sources being introduced.

Overall, the new method, apparatus, and system allows for an adaptive real-time power flow management technique enabling non-critical loads on the grid to operate at a reduced consumption rate and, additionally, in the case of loads having energy storage systems, the new method, apparatus and system allows the non-critical loads to become sources as needed, all while increasing power factor and reducing THD.

Constraint Based Current Control

According to an embodiment of the invention, a constraint-based current control system is provided that not only considers RMS upper bounds on a system, but also considers the possible combinations of the actual current profiles of the loads in order to optimize power factor.

The discussion which follows on the constraint based current method assumes RMS currents. According to an embodiment, a power supply ($I_s$) is set as a total upper bound current of a system. In other words, the total current of the system cannot exceed the power supply. Furthermore, a current of each individual load of the system is identified as $I_{Lx}$. According to the embodiment, a constraint is set indicating that the power supply is greater than or equal to the total current of the individual loads of the system. This is shown in the following equation, where n equals the number of individual loads of the system:

$$I_S \geq \sum_n I_{Lx}$$

According to the embodiment, this constraint needs to be satisfied. This constraint can be based on one or more system constraints. For example, the constraint can be based on a power supply of the system. This constraint can also be based on one or more user-defined constraints. For example, the constraint can be lower than a power supply of the system, based on a demand identified by one or more users. The constraint can also be a combination of one or more system constraints and one or more user-defined constraints. Finally, either a system constraint or a user-defined constraint can be based on a single load, multiple loads, or a total number of loads in a system.

At a power management server, a calculation is made to calculate an available excess power on the grid ($I_A$). This is shown in the following equation:

$$I_A = I_S - \sum_n I_{Lx}$$

According to an embodiment of the invention, when a non-critical load is introduced to the system, the load current of the new load is compared to $I_A$. If $I_A$ is greater than the load current, then the load is activated through the ILMUC. If $I_A$ is less than the load current, then the load is not activated until a new optimal switching configuration is calculated and implemented. The new optimal switching configuration is described below in greater detail. If an electrical resource is connected then, if $I_A$ is greater, the resource is allowed to draw current. Otherwise the electrical resource may become a current source under a defined priority, as will also be discussed in greater detail.

Furthermore, if $I_A$ is reduced to zero, either by additional connections of non-critical loads or by user defined constraint, then any resources that are connected to the grid stop drawing the current and source operation begins, as will also be described in greater detail.

Current Profiling

An ILMUC has the ability to measure and record the current waveforms of loads and sources. The ILMUC is described in greater detail below. The current waveforms are then stored on the central power management server in a power library. This storage of current waveforms on the central power management server, in a power library, is also identified as "current profiling" According to an embodiment of the invention, a RMS value, which corresponds to a current profile, can also be stored in the power library of a central power management server. The significance of current profiling is illustrated in FIG. 1, which will now be described in more detail.

FIG. 1 illustrates current profiling utilized to optimize a power factor in accordance with an embodiment of the invention. FIG. 1 illustrates four current profiles, $I_1$, $I_2$, $I_3$, and $I_4$. Each current profile represents a current of a unique load in a system. As can be seen in FIG. 1, current profiles $I_1$ and $I_2$ have identical current profiles, and current profiles $I_3$ and $I_4$ also have identical current profiles. FIG. 1 also illustrates four RMS values, $I_{rms1}$, $I_{rms2}$, $I_{rms3}$, and $I_{rms4}$, where each RMS value corresponds to one of the four current profiles. FIG. 1 also illustrates a current profile of a combination of currents $I_1$ and $I_2$, identified as $I_{fundamental(I1,I2)}$, a current profile of a combination of currents $I_1$ and $I_2$, identified as $I_{fundamental(I1,I2)}$, and a voltage waveform, identified as V. FIG. 1 also illustrates the power factor of current profiles $I_{fundamental(I1,I2)}$ and $I_{fundamental(I1,I3)}$, where the power factor equals $\cos(\alpha)$.

Assuming that $I_{rms1} = I_{rms2} = I_{rms3} = I_{rms4}$ as illustrated in FIG. 1, it can be seen that there are two completely unique current waveforms (i.e., the current waveforms of I1 and I2, and the current waveforms of I3 and I4), which have different power factors and THD. According to an embodiment, the available excess power on the grid, $I_A$, can be:

$$I_A = 2I_{rms1} + \delta \text{ where } 0 \leq \delta \leq I_{rms1}$$

Assuming this available excess power, then by considering only RMS values for the constraint, it can be determined that the upper bound current constraint can be satisfied by activating any two loads. This is because the total RMS value for the two loads is $2I_{rms1}$, which is less than or equal to $I_A$ (i.e., $2I_{rms1} + \delta$). Thus, for example, the upper bound current constraint can be satisfied by activating loads 1 and 2 (i.e., $I_{fundamental(I1,I2)}$). As another example, the upper bound current constraint can also be satisfied by activating loads 1 and 3 (i.e., $I_{fundamental(I1,I3)}$). However, according to this embodiment, it can be determined that the combination of loads 1 and 3 is a more optimal switching configuration than the combination of loads 1 and 2, based on the current waveforms, because the combination of loads 1 and 3 has a significantly better power factor and THD, even though both combinations satisfy the constraint. Thus, it can be determined that switching loads 1 and 3 are a more optimal configuration than switching loads 1 and 2.

By generating current profiles of loads and having switching control of the loads, smart-grid efficiency can be provided. Current profiling for each device can also be performed under various switching configurations. This translates into a power library that is effectively a "3D" library allowing for a large range of control flexibility under numerous load switching configurations.

AC Cycle Control

Traditionally power control for AC circuits has been done through thyristors, and the ON gating is controlled by the phase 'alpha' that triggers the thyristor to turn ON at a particular off-zero angle of the AC voltage. This controls the output voltage, but produces tremendous harmonics and a bad power factor on the line. Furthermore, the inrush currents associated with the load usually tend to reduce the loads life. A zero-crossing thyristor controlled component, in some cases also known as a Solid State Relay (SSR), is a thyristor which when gated only turns ON at the zero-crossing of the AC cycle. This substantially improves the power factor and does not affect load life, but has discretized control of voltage to the load. By discretized control, the voltage can be controlled using only a multiple of 8.3 ms duty cycle over a set period of AC cycles.

Optimum Switching Configuration

According to an embodiment of the invention, when the available power or current of the system cannot meet the demands of the aggregated sum of non-critical loads, the available power must be uniformly divided amongst the loads. To do so, a power library is referenced and an optimal switching configuration is determined which will optimize a power factor and reduce THD.

According to the embodiment, an aggregated summation search is performed based on the RMS values of the loads in the power library. Once all configurations are identified to meet the power constraints the current profiles associated with these configurations are used to optimize the aggregated power factor and THD.

The optimization is based on a fast mathematical and heuristic algorithm that uses the current profiles to search for the optimal power factor based on the configuration constraints. The algorithm is expressed mathematically as:

$$\max: pf$$
$$\sum_n I_{Lx} \leq I_A$$
$$\sum_n THD_{ILx} \leq THD_{Limit}$$

where pf is a power factor, n is a number of individual loads in a system, $I_{LX}$ is a current of each individual load of the system, $I_A$ is an available excess power on the grid, $THD_{ILx}$ is a THD of each individual load of the system, and $THD_{Limit}$ is a predefined THD limit of the system.

According to an embodiment, for the calculation of optimal power factor with the THD constraint, the Fourier transforms (FTs) of all the current waveforms are also stored in the power library. The FTs can be used to increase the speed of the optimization process and reduce computational overhead.

In one embodiment of the invention, optimal power factor configuration can be performed at the grid or system level. In an alternate embodiment, optimal power factor configuration can be performed at a sub-grid level. Depending on the required speed of calculation for real time applications, the system can be broken up and macro-modeled into sub-grid systems. This allows for reduced calculation overhead when new loads and resources are introduced. According to the alternate embodiment, once sub-grid calculations are performed, then system level calculations can be executed, and an iteration process of the results from the system level can be mapped to the sub-grid and further iterated. In the case where non-critical loads and sub-grids are at large distances from each other, then distribution line modeling can be incorporated in the calculations. This can take advantage of the inherent line capacitances and inductances on the grid for further power factor optimization.

According to the embodiment, once the optimal switching configuration has been calculated, the results are transmitted to the ILMUCs, which will be described in more detail.

Switching Synchronization

According to an embodiment, in order for the ILMUCs to implement the optimal switching configuration, a synchronization signal is available on the AC power line, which is a multiple of AC cycles. This signal can be dynamic with a varying period. The advantage of having a variable synchronization signal is that granularity of voltage control can be increased. The synchronization signal is implemented at the trailing edge of an AC cycle and can be placed on the line at the substation level or by a specially designated ILMUC in an area. With this signal, ILMUCs can latch and execute the switching configuration as instructed by the power management server.

Resource Management

According to an embodiment of the invention, when $I_A$ becomes zero or negative, a switching configuration, similar to the switching configuration described above, may be calculated to optimize a power factor for sources. In other words, a switching configuration can be calculated where one or more resources are deactivated and reactivated as sources.

According to the embodiment, as $I_A$ is reduced, power delivery to non-critical loads follows. As the last load or set of loads become inactive on a grid or sub-grid system, a decision can be made to deactivate any possible resources working as non-critical loads and activate them as sources. A methodology similar to the methodology described above, with current source profiles in the library and an optimization algorithm, may be used in order to provide clean and cost effective power to the system.

The algorithm can expressed in a mathematical formula that is similar to the mathematical formula previously depicted, but with a slight modification as $I_A$ stays negative in value:

$$\max: pf$$
$$\sum_n I_{Sx} \geq |I_A|$$
$$\sum_n THD_{ISx} \leq THD_{Limit}$$

where pf is a power factor, n is a number of individual sources in a system, $I_{SX}$ is a current of each individual source of the system (where each individual source was previously converted from an individual load), $I_A$ is an available excess power on the grid, $THD_{ISx}$ is a THD of each individual source of the system, and $THD_{Limit}$ is a predefined THD limit of the system.

According to the embodiment, resource management at the grid or sub-grid level can be performed in a manner that prevents power from being bounced from one resource to another (i.e., discharging one resource to charge another).

Implementation

Figure 2:
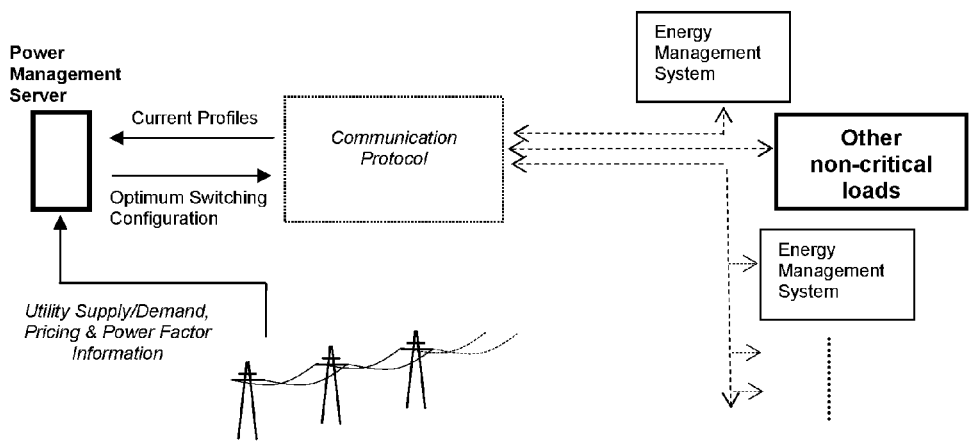
FIG. 2 illustrates a system for power factor correction according to an embodiment of the invention.

FIG. 2 illustrates a system for power factor correction according to an embodiment of the invention. As illustrated in FIG. 2, the system includes a power management server, a communication protocol, and one or more loads, which are illustrated in FIG. 2 as one or more energy management systems, and one or more non-critical loads. One of ordinary skill in the art would readily appreciate that a system can include any number of energy management systems, according to alternate embodiments, and still be within the scope of the invention. Furthermore, one of ordinary skill in the art would also appreciate that the system can include any number of non-critical loads, in accordance with alternate embodiments, and still be within the scope of the invention. As previously described, each load of the system can be converted into a source, and thus, each load of the system can double as a source. In accordance with an embodiment, each non-critical load and energy management system can include one or more ILUMCs (not shown).

According to the embodiment, the power management server includes a total current determining unit configured to determine a total current requirement of one or more loads coupled to a current supply. The power management server also includes a current determining unit configured to determine a current available beyond the total current requirement. The power management server also includes a non-critical load determining unit configured to determine whether a non-critical load is coupled to the current supply. The power management server also includes a calculation unit configured to calculate an optimal switch configuration to deliver available current to the non-critical load when a current requirement of the non-critical load exceeds the current available beyond the total current requirement.

According to the embodiment, the power management server contains a database of current profiles and their associated Fourier transforms. According to an embodiment of the invention, each current profile and the associated Fourier transfer corresponds to a non-critical load or an energy management. For every change that occurs on the grid, such as an activation or deactivation of a load or source, a new switching configuration is calculated and that information for each load and source is communicated to the individual units for implementation. As a grid system may be rather large, an iterative approach can be used to calculate and implement the optimal switching configuration, in accordance with a combination of the invention.

Each ILMUC communicates to the power management server each time a load or source becomes active, according to the embodiment. Each ILMUC contains current sensors and can store the current profile of a load or source until the profile is communicated to the power management server for storing. ILMUC software can be updated through the communication protocol to revise the AC cycle testing for current profiling.

According to an embodiment, the power management server can receive utility supply/demand pricing and power factor information. This information can be used, in part, to set power constraints for the system, where the power constraints can be utilized in the optimum switching configuration.

Figure 3:
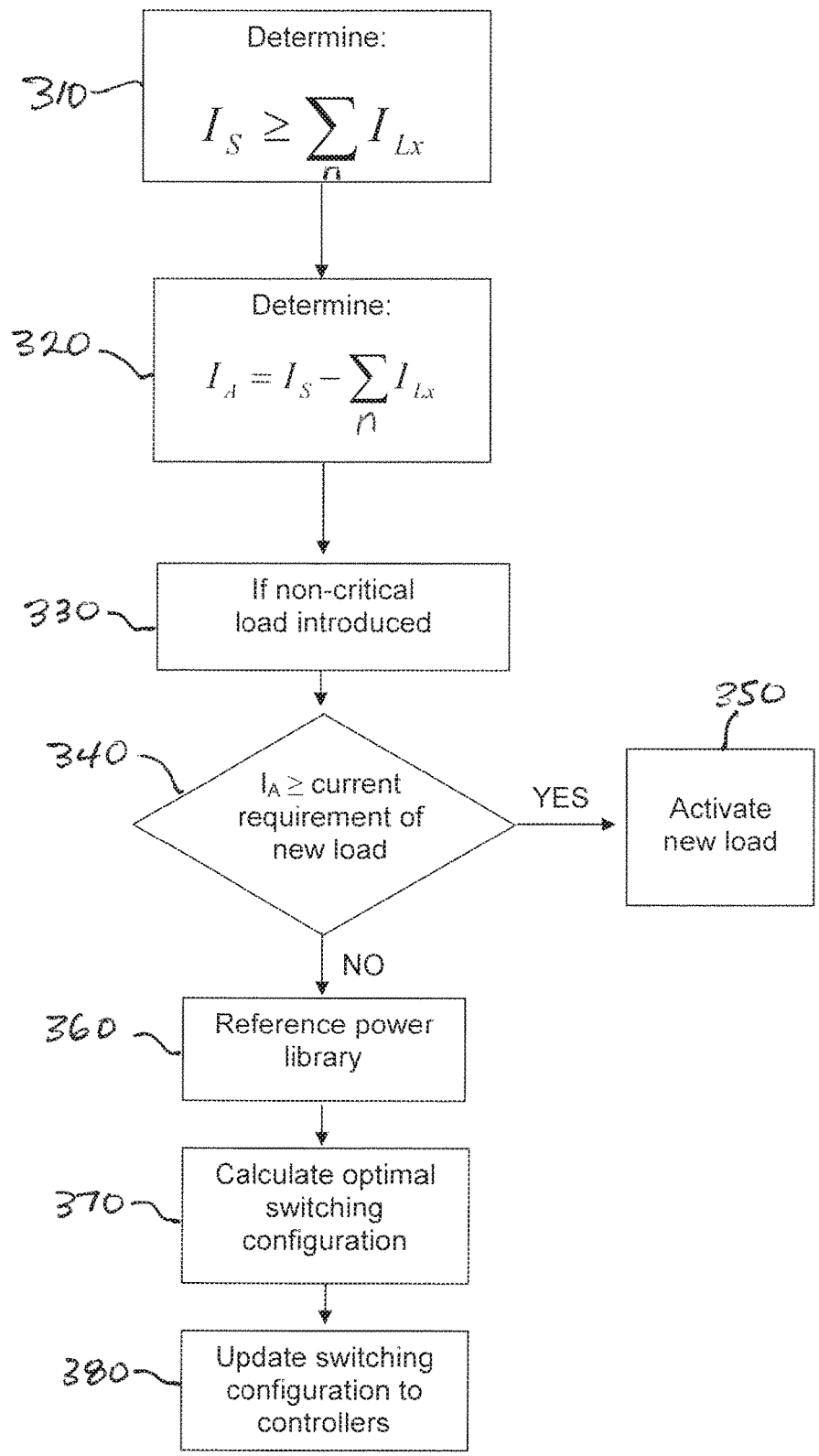
FIG. 3 illustrates a method of power factor correction according to an embodiment of the invention.

FIG. 3 illustrates a method of power factor correction according to an embodiment of the invention. In one embodiment of the invention, the steps of the method can be performed by the power management server illustrated in FIG. 2. At step 310, a total current requirement of at least one load coupled to a current supply is determined. In FIG. 3, the total current requirement of the at least one load is represented by $$\sum_n I_{Lx}.$$

According to an embodiment, a power supply (represented in FIG. 3 as $I_s$) is set as a total upper bound current of a system. In other words, the total current of the system cannot exceed the power supply. Furthermore, according to the embodiment, a constraint is set indicating that the power supply is greater than or equal to the total current requirement of the at least one load, and it is determined that this constraint is satisfied. This is represented in FIG. 3 as:

$$I_S \geq \sum_n I_{Lx}$$

At step 320, it is determined if any current is available beyond the total current requirement of the at least one load coupled to the current supply. A current available beyond the total current requirement of the at least one load is represented in FIG. 3 as $I_A$. Furthermore, the determination of the current available beyond the total current requirement of the at least one load coupled to the current supply is represented in FIG. 3 as:

$$I_A = I_S - \sum_n I_{Lx}$$

At step 330, it is determined whether a non-critical load is coupled to the current supply. According to the embodiment, the non-critical load is a new non-critical load introduced in the system.

At step 340, it is determined whether a current requirement of the non-critical load exceeds the current available beyond the total current requirement of the at least one load (represented in FIG. 3 as $I_A$). As previously described, the non-critical load is a new non-critical load introduced in the system.

At step 350, when it is determined that a current requirement of the non-critical load does not exceed the current available beyond the total current requirement of the at least one load, the non-critical load is activated, and the method terminates.

At step 360, when it is determined that a current requirement of the non-critical load does exceed the current available beyond the total current requirement of the at least one load, a power library is referenced. According to the embodiment, the power library includes current requirement information of the at least one load stored on a database, where the current requirement information can be used in an optimal switching configuration.

At step 370, an optimal switching configuration is calculated. According to the embodiment, calculating the optimal switching configuration involves uniformly dividing available current amongst the one or more non-critical loads, so that current can be delivered to each of the one or more non-critical loads.

At step 380, the ILMUCs (identified in FIG. 3 as controllers) are updated with the calculated optimal switching configuration. According to an embodiment, the ILMUCs can be updated by including the calculated optimal switching configuration in a synchronization signal, and communicating the synchronization signal to the ILMUCs.

The method steps performed in FIG. 3 may be performed by a computer program product embodied on a computer-readable medium, encoding instructions for performing at least the method described in FIG. 3, in accordance with an embodiment of the present invention. The computer program product may be embodied on a computer readable medium, such as a storage medium. For example, a computer program product may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. The computer program product may include encoded instructions for implementing the method described in FIG. 3, which may also be stored on the computer readable medium.

The computer program product can be implemented in hardware, software, or a hybrid implementation. The computer program product can be composed of modules that are in operative communication with one another, and which are designed to pass information or instructions to a communication device, such as a user equipment or a base station. The computer program product can be configured to operate on a general purpose computer, or an application specific integrated circuit (ASIC).

Figure 4:
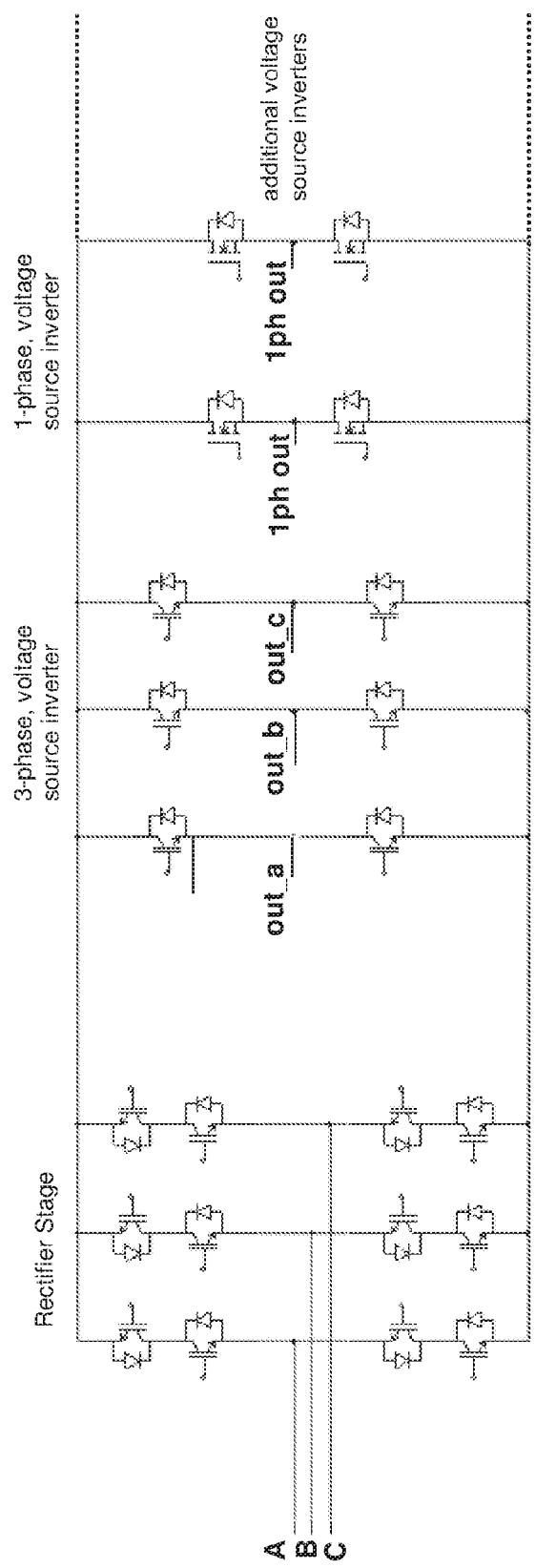
FIG. 4 illustrates an architecture of an intelligent load management unit controller according to an embodiment of the invention.

FIG. 4 illustrates an architecture of ILMUC according to an embodiment of the invention. The architecture is based on an expandable architecture of a sparse matrix drive technology with multiple load output control. According to the embodiment, the architecture can provide added flexibility in demand response control and can ease the computational overhead associated with space vector analysis for traditional drive systems.

The architecture in FIG. 4 includes a 3-phase voltage input (illustrated in FIG. 4 as A, B, and C), a rectifier stage, a 3-phase, voltage source inverter, a 1-phase, voltage source inverter, 22 switches, and 5 voltage outputs. As also illustrated in FIG. 4, the architecture can include additional voltage source inverters. One of ordinary skill in the art would readily appreciate that the architecture can include any number of voltage source inverters and still be within the scope of the invention. One of ordinary skill in the art would also appreciate that the architecture can include any number of switches, and any number of voltage outputs, and still be within the scope of the invention.

According to the embodiment, voltage is passed through the 3-phase voltage input. At the rectifier stage, the voltage for each phase is split into positive voltage (which travels along the top of the architecture) and ground voltage (which travels along the bottom of the architecture). At the 3-phase, voltage source inverter, the positive voltage and the ground voltage, for each phase, are each inverted, combined, and then passed through a respective voltage output (identified as "out A", "out B", and "out C"). At the 1-phase, voltage source inverter, the positive voltage and the ground voltage are each inverted, combined, and then passed through a voltage output for a single phase (identified as "1-ph out"). Accordingly to the embodiment, a current sensor (not shown) can be included in the architecture to record a current value corresponding to the voltage that travels through the architecture. The current sensor can, thus, measure current in real time, allowing the ILMUC to transmit a current measurement to a power management server.

Figure 5:
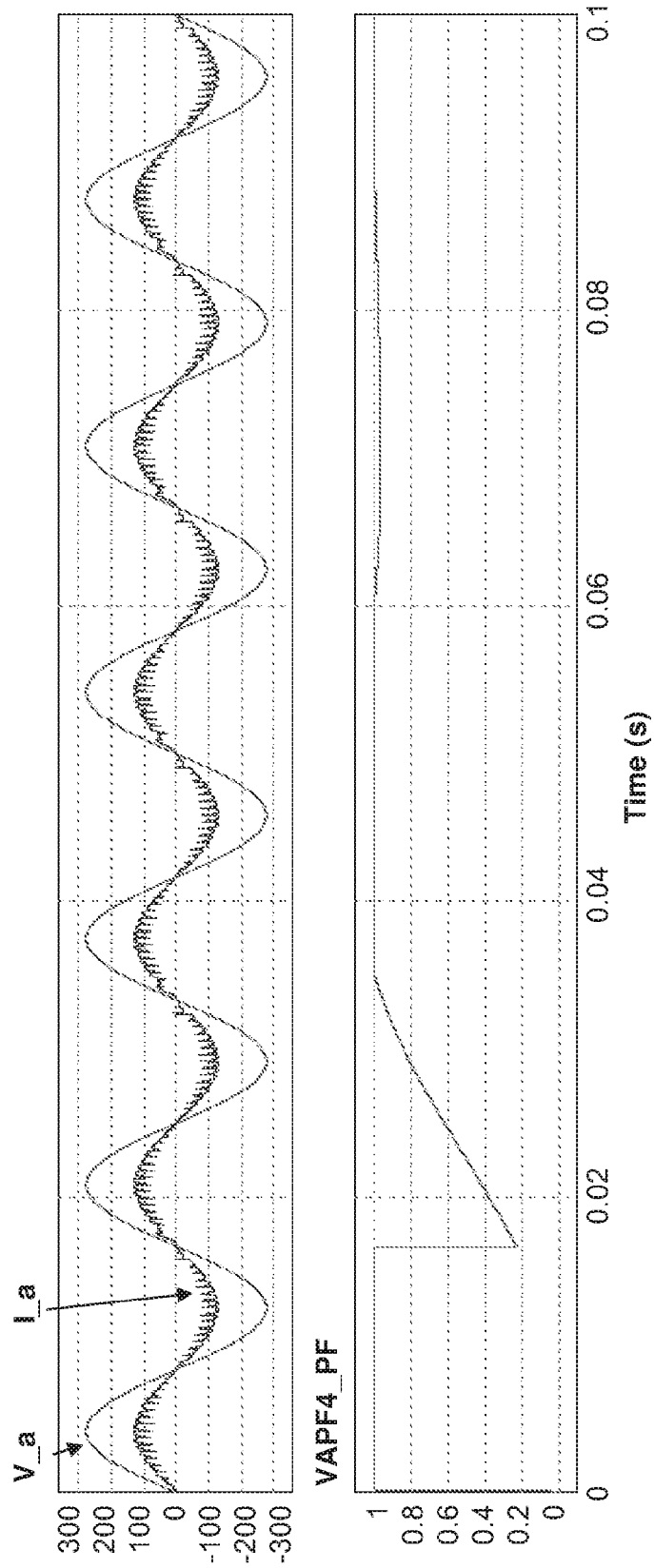
FIG. 5 illustrates an example of power factor correction using two voltage regulated loads according to an embodiment of the invention.

FIG. 5 illustrates an example of power factor correction using two voltage regulated loads according to an embodiment of the invention. FIG. 5 includes two graphs. The top graph illustrates one phase of a 3-phase system, and includes voltage V_a, which is a supply voltage, and current I_a, which is a total current of the two loads, where the total current is optimized by an optimization algorithm. The bottom graph illustrates a power factor, VAPF4_PF, of the 3-phase system. As illustrated in FIG. 5, the power factor converges to 1.0 as time progresses.

Thus, in accordance with an embodiment of the invention, power factor correction is performed through optimization of load and source currents on the system based on dynamic current constraints. Furthermore, as power factor is corrected a method of THD reduction is achieved. In order to optimize power factor, a method of current profiling and storing the profiles in a power library with the associated Fourier transforms of loads and sources is harnessed. The power library can be a "3D" library of current profiles for loads and sources under different switching configurations. The optimization and algorithmic search is performed under dynamic current constraints of the system which are user defined, specification limits or electricity pricing associated. A non-linear program is implemented to find maximum power factor given the current constraints. Transmission line modeling is incorporated in sub-grid system calculations that are located at distances from one another. For power factor optimization between sub-grids and the grid a method of mapping and iterating results is implemented. In order to implement optimal power factor correction all ILMUCs are synchronized using a dynamic signal on the power line or radio frequency.

Thus, embodiments of the present invention offer many advantages. For example, according to an embodiment, the proposed method and system regulates current to non-critical loads for a grid or a sub-grid of an electrical system by using upper bound current constraints. The method and system can be adaptive in real-time and recalculate the operational mode each time a new load or source is introduced to the electrical system. This novel approach to upper bound current constraint management can allow for system specifications, associated cost and demand levels enforced by the utility, including maximum electrical generation output with source availability consideration to be managed in any combination thereof. The current constraints are dynamic in nature in that they may fluctuate based on system changes.

Furthermore, according to the embodiment, the proposed method and system also have a very high level of current control granularity. This translates to a tremendous amount of flexibility and control for smart-grid system deployments containing such non-critical loads. Non-critical loads may also include high consumers of electricity such as air conditioners, refrigerators, dryers and the like.

In addition, in certain embodiments, power factor optimization can be implemented through a unique software profiling methodology and algorithmic control, using very minimal hardware/firmware devices to deliver a high level of electrical current control and management granularity.

The proposed method and system are also capable of calculating total harmonic distortion (THD) of a load/source, and introducing an upper bound constraint of THD to the system under operational control.

Finally, the proposed method and system can include a current profiling methodology. This can generate a knowledge database or power library used to calculate optimum grid and sub-grid performance while concurrently identifying faulty devices, or inferior designed load/sources.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A system for optimizing electrical power flow in an electrical distribution network, comprising:
   a first plurality of intelligent load management controllers (ILMUCs) configured to control power delivery to a first plurality of electrical devices coupled to a first sub-grid of the electrical distribution network;
   a second plurality of ILMUCs configured to control power delivery to a second plurality of electrical devices coupled to a second sub-grid of the electrical distribution network; and
   a power management server in communication with the first and second pluralities of ILMUCs configured to receive current use information from said first and second pluralities of ILMUCs and determine and control first and second switching configurations of the first and second pluralities of ILMUCs,
   wherein the power management server is further configured to determine and control a system-level switching configuration based on the determined first and second switching configurations of the first and second pluralities of ILMUCs.

2. The system of claim 1, wherein the power management server is configured to determine the first, second, and system-level switching configurations iteratively to optimize the first switching configuration of the first sub-grid and/or the second switching configuration of the second sub-grid.

3. The system of claim 2, wherein optimizing the first switching configuration comprises maximizing the power factor of the first sub-grid and optimizing the second switching configuration comprises maximizing the power factor of the second sub-grid.

4. The system of claim 2, wherein optimizing the first switching configuration and/or second switching configuration comprises taking into consideration pricing information and/or supply and demand information.

5. The system of claim 1, wherein the power management server is configured to determine the first, second, and system-level switching configurations iteratively to optimize a power factor of the electrical distribution network as a whole.

6. The system of claim 5, wherein optimizing the system-level switching configuration comprises maximizing the power factor of the electrical distribution network as a whole.

7. The system of claim 5, wherein optimizing the system-level switching configuration comprises taking into consideration pricing information and/or supply and demand information.

8. A method of optimizing power flow in an electrical power distribution system, comprising:
   receiving a first set of current use patterns of one or more loads coupled to a first sub-grid of a power grid;
   receiving a second set of current use patterns of one or more loads coupled to a second sub-grid of the power grid;
   using the first set of current use patterns, determining a first sub-grid switching configuration of a first plurality of intelligent load management controllers (ILMUCs) that control power delivery to the one or more loads coupled to the first sub-grid;
   using the second set of current use patterns, determining a second sub-grid switching configuration of a second plurality of ILMUCs that control power delivery to the one or more loads coupled to the second sub-grid;
   determining a system-level switching configuration based on the determined first and second sub-grid switching configurations; and
   directing the first and second pluralities of ILMUCs to operate according to the determined system-level switching configuration.

9. The method of claim 8, wherein determining the first sub-grid switching configuration, determining the second sub-grid switching configuration, and determining the system-level switching configuration are performed iteratively to determine a system-level optimum switching configuration that maximizes a system-level power factor.

10. The method of claim 9, wherein the optimum switching configuration is determined taking into account a first sub-grid upper bound power constraint, a second sub-grid upper bound power constraint, and/or a system-level upper bound power constraint.

11. The method of claim 8, wherein determining the system-level switching configuration is performed using pricing information and/or supply and demand information.

12. The method of claim 8, further comprising
   determining an available excess current that can be supplied to electrical loads coupled to the first sub-grid; and
   directing an ILMUC associated with the first sub-grid to deactivate a load it is controlling and reactivate it as a source if it is determined that the available excess current has become zero or negative.

13. The system of claim 12, wherein upon reactivating the load as a source, determining an updated system-level optimum switching configuration.

* * * * *